United States Patent
Li et al.

(10) Patent No.: US 11,070,264 B2
(45) Date of Patent: Jul. 20, 2021

(54) DOWNLINK-BEAM ADJUSTMENT METHOD AND APPARATUS

(71) Applicant: HUAWEI TECHNOLOGIES CO., LTD., Shenzhen (CN)

(72) Inventors: Sainan Li, Chengdu (CN); Huang Huang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 6 days.

(21) Appl. No.: 16/455,786

(22) Filed: Jun. 28, 2019

(65) Prior Publication Data
US 2019/0349049 A1   Nov. 14, 2019

Related U.S. Application Data

(63) Continuation of application No. PCT/CN2017/118681, filed on Dec. 26, 2017.

(30) Foreign Application Priority Data

Dec. 28, 2016 (CN) .......................... 201611238127.2

(51) Int. Cl.
*H04B 7/06* (2006.01)
*H04W 56/00* (2009.01)
*H04W 72/00* (2009.01)
*H04W 72/04* (2009.01)

(52) U.S. Cl.
CPC ......... *H04B 7/0617* (2013.01); *H04B 7/0695* (2013.01); *H04W 56/001* (2013.01); *H04W 72/005* (2013.01); *H04W 72/046* (2013.01)

(58) Field of Classification Search
CPC ...... H04B 7/086; H04B 7/063; H04B 7/0695; H04B 7/0617; H04W 8/22; H04W 28/16; H04W 76/10; H04W 56/001; H04W 72/005; H04W 72/046
See application file for complete search history.

(56) References Cited

U.S. PATENT DOCUMENTS

| | | | |
|---|---|---|---|
| 9,642,165 B2* | 5/2017 | Jung | .................... H04W 72/042 |
| 2007/0054700 A1* | 3/2007 | Hovers | .................. H04B 7/061 |
| | | | 455/562.1 |
| 2013/0051302 A1 | 2/2013 | Kim | |

(Continued)

FOREIGN PATENT DOCUMENTS

| | | |
|---|---|---|
| CN | 103765794 A | 4/2014 |
| CN | 103782524 A | 5/2014 |

(Continued)

*Primary Examiner* — Melanie Jagannathan
(74) *Attorney, Agent, or Firm* — Kilpatrick Townsend & Stockton LLP

(57) ABSTRACT

Embodiments can provide a downlink-beam detection method and an apparatus. Under the method a terminal device can be notified by a network device of information about a broadcast beam. The network device can receive a detection result reported by the terminal device. The detection result may pertain to broadcast beam detection performed based on the information about the broadcast beam. the network device can then determine, based on the detection result, a downlink beam that needs to be swept during downlink-beam adjustment and that is used for data communication. This reduces signaling overheads.

10 Claims, 6 Drawing Sheets

Wide                                            Narrow

(56) References Cited

U.S. PATENT DOCUMENTS

| | | |
|---|---|---|
| 2013/0059619 A1 | 3/2013 | Kim et al. |
| 2013/0217404 A1* | 8/2013 | Jung .................. H04W 48/20 |
| | | 455/452.1 |
| 2013/0272220 A1* | 10/2013 | Li ...................... H04B 7/0848 |
| | | 370/329 |
| 2013/0301567 A1* | 11/2013 | Jeong ............... H04W 74/0833 |
| | | 370/329 |
| 2014/0004869 A1 | 1/2014 | Jung |
| 2014/0139372 A1* | 5/2014 | Seol ..................... H04B 7/086 |
| | | 342/367 |
| 2014/0323143 A1* | 10/2014 | Jung ................... H04L 5/0025 |
| | | 455/452.1 |
| 2016/0095102 A1 | 3/2016 | Yu et al. |
| 2016/0309305 A1* | 10/2016 | Wilhelmsson ....... H04B 7/0408 |
| 2016/0373180 A1* | 12/2016 | Guo ..................... H04B 7/0695 |
| 2017/0201892 A1 | 7/2017 | Wen et al. |
| 2017/0207843 A1* | 7/2017 | Jung ..................... H04W 74/006 |
| 2017/0207845 A1* | 7/2017 | Moon .................. H04B 7/0695 |
| 2018/0006784 A1 | 1/2018 | Su |
| 2018/0227031 A1* | 8/2018 | Guo ..................... H04B 7/0695 |
| 2018/0310322 A1* | 10/2018 | Zhang ................ H04W 72/085 |
| 2018/0343043 A1* | 11/2018 | Hakola ............... H04B 7/0417 |
| 2018/0359790 A1* | 12/2018 | Ingale ................. H04W 28/16 |
| 2019/0104549 A1* | 4/2019 | Deng .................. H04B 7/0617 |
| 2019/0141692 A1* | 5/2019 | Subramanian ......... H04B 7/063 |
| 2019/0166568 A1* | 5/2019 | Tang ..................... H04L 1/1812 |
| 2019/0268056 A1* | 8/2019 | Wang .................. H04B 7/0695 |
| 2020/0137821 A1* | 4/2020 | Cirik ................... H04B 17/327 |

FOREIGN PATENT DOCUMENTS

| | | |
|---|---|---|
| CN | 105897322 A | 8/2016 |
| CN | 105991175 A | 10/2016 |
| WO | 2016065644 A1 | 5/2016 |

* cited by examiner

DOWNLINK-BEAM ADJUSTMENT METHOD AND APPARATUS

CROSS-REFERENCE TO RELATED APPLICATIONS

This application is a continuation of International Application No. PCT/CN2017/118681, filed on Dec. 26, 2017, which claims priority to Chinese Patent Application No. 201611238127.2, filed on Dec. 28, 2016, The disclosures of the aforementioned applications are hereby incorporated by reference in their entireties.

TECHNICAL FIELD

This application relates to the field of wireless communications, and more specifically, to a downlink-beam adjustment method and an apparatus.

BACKGROUND

To meet a large-capacity and high-rate transmission requirement of a mobile communications system, a high frequency band greater than 6 GHz is introduced for communication, to utilize transmission characteristics of large bandwidth and a high rate of the high frequency band, which is one of hot research technologies of a 5G communications system. Because of a high path loss in high-frequency communication, a narrow beam needs to be used to ensure a propagation distance and a high beam gain. However, a coverage area of the narrow beam is limited. To ensure communication quality, narrow beam alignment needs to be performed between a high-frequency base station and a terminal. In a beam alignment process, directional beam combinations of a transmit end and a receive end may need to be traversed. In addition, because of a factor such as movement of the terminal or a change in an environment, a beam pair between the terminal and the base station may change. Therefore, beam adjustment needs to be performed periodically or non-periodically. In a beam adjustment process, directional beam combinations, in a specific range, of the transmit end and the receive end also need to be traversed. If the receive end and the transmit end both use directional beams, a quantity of the beam combinations is very large, resulting in sharp increase of system overheads.

SUMMARY

This application provides a downlink-beam adjustment method and an apparatus, and specifically is about determining a to-be-swept beam in a beam adjustment process, to reduce signaling overheads in the beam adjustment process.

According to a first aspect, a downlink-beam adjustment method is disclosed, including:

receiving, by a network device, information that is sent by a terminal device and that is about a downlink beam used for data communication with the terminal device; determining, by the network device based on the information about the downlink beam, a broadcast beam related to the downlink beam; and notifying the terminal device of information about the broadcast beam related to the downlink beam; and receiving, by the network device, a detection result, reported by the terminal device, of broadcast beam detection performed based on the information about the broadcast beam; and determining, by the network device based on the detection result, a downlink beam that needs to be swept during downlink-beam adjustment and that is used for data communication.

According to another aspect, a downlink-beam adjustment method is disclosed, including:

notifying, by a terminal device, a network device of information about a downlink beam used for data communication between the network device and the terminal device; receiving, by the terminal device, information that is sent by the network device and that is about a broadcast beam related to the downlink beam; performing, by the terminal device, broadcast beam detection based on the information about the broadcast beam related to the downlink beam, and reporting a detection result to the network device, where the detection result is used by the network device to determine a downlink beam that needs to be swept and that is used for data communication; and detecting, by the terminal device, the downlink beam that is swept by the network device and that is used for data communication.

In the technical solutions of the foregoing two aspects, the downlink-beam adjustment method is described separately from perspectives of steps performed by the network device and steps performed by the terminal device. Downlink-beam adjustment is adjustment of a downlink beam used for data communication. The network device may be one or more base stations, may be a network device of another type, for example, a TRP (transmission reception point, transmission/reception point), or may be a device that has a central control function and that is configured to control a plurality of base stations or TRPs.

According to another aspect, a downlink-beam adjustment method is further disclosed, including:

notifying, by a terminal device, a base station of a narrow beam whose signal strength is highest and that is aligned between the base station and the terminal device; notifying, by the base station, the terminal device of a wide beam in which the narrow beam whose signal strength is highest is located; determining, by the terminal device, a wide beam whose signal strength is second highest and that surrounds the wide beam, and notifying the base station; and sweeping, by the base station, a plurality of narrow beams that surround the narrow beam whose signal strength is highest and that are close to the wide beam whose signal strength is second highest, so that the terminal device detects and reports a narrow beam that satisfies a signal quality requirement.

In the foregoing solution, after learning about the narrow beam whose signal strength is highest, the base station notifies the terminal device of information about the wide beam that covers the narrow beam; the terminal device determines, after detection, two wide beams whose signal strength is highest, and notifies the base station; and then, the base station may sweep a narrow beam that is between the two wide beams and that surrounds the narrow beam whose signal strength is highest. This reduces a quantity of swept beams and reduces overheads.

According to another aspect, a downlink-beam adjustment method is disclosed, including:

notifying, by a terminal device, a base station of a narrow beam whose signal strength is highest and that is aligned between the base station and the terminal device; notifying, by the base station, the terminal device of a wide beam in which the narrow beam whose signal strength is highest is located; detecting, by the terminal device, signal strength of each downlink wide beam, and if a wide beam different from the wide beam in which the narrow beam whose signal strength is highest is located has highest signal strength, notifying the base station of the wide beam whose signal strength is highest; and using, by the base station, the wide beam whose signal strength is highest as a current serving wide beam.

In the solutions of the foregoing aspects, the narrow beam is a downlink beam used for data communication, and the wide beam is a broadcast beam such as a synchronization beam.

Based on the foregoing aspects, the downlink beam used for data communication with the terminal device is a downlink beam whose signal strength is highest or a downlink beam whose signal quality is higher than a preset threshold. There may be a plurality of downlink beams whose signal quality is higher than the preset threshold, and the plurality of downlink beams may be from one or more base stations.

Based on the foregoing aspects, the broadcast beam related to the downlink beam used for data communication with the terminal device may include at least one of the following: a broadcast beam in which the downlink beam is located, and a broadcast beam spatially adjacent to the broadcast beam in which the downlink beam is located.

Based on the foregoing aspects, the detection result of the broadcast beam detection includes at least one of the following: a detection result of a broadcast beam whose signal quality is higher than a specified threshold, a detection result of a broadcast beam whose signal quality is highest, and a detection result of a broadcast beam whose signal quality is second highest. For example, the detection result may be the detection result of the broadcast beam whose signal quality is highest and the detection result of the broadcast beam whose signal quality is second highest.

Based on the foregoing aspects, the detection result of the broadcast beam detection includes at least one of the following: information about the broadcast beam and/or signal quality of the broadcast beam.

Based on the foregoing aspects, the information about the downlink beam includes at least one of the following: a beam identifier, an OFDM (orthogonal frequency division multiplexing, orthogonal frequency division multiplexing) symbol index, a frame number, a subframe number, a beam resource location, and an antenna port number.

The information about the broadcast beam includes at least one of the following: a beam identifier, an OFDM symbol index, a frame number, a subframe number, a beam resource location, and an antenna port number.

Based on the method according to the first aspect, a network device is further disclosed, including:

a receiving module, configured to receive information that is sent by a terminal device and that is about a downlink beam used for data communication with the terminal device; a determining module, configured to determine, based on the information about the downlink beam, a broadcast beam related to the downlink beam; and a sending module, configured to notify the terminal device of information about the broadcast beam related to the downlink beam, where the receiving module is further configured to receive a detection result, reported by the terminal device, of broadcast beam detection performed based on the information about the broadcast beam.

With reference to the foregoing aspects, the determining module is further configured to determine, based on the detection result, a downlink beam that needs to be swept during downlink-beam adjustment and that is used for data communication.

The network device may be a base station, a TRP, or a network device of another type.

Based on the method according to the second aspect, a terminal device is further disclosed, including:

a sending module, configured to notify a network device of information about a downlink beam used for data communication between the network device and the terminal device; a receiving module, configured to receive information that is sent by the network device and that is about a broadcast beam related to the downlink beam; and a detection module, configured to perform broadcast beam detection based on the information about the broadcast beam related to the downlink beam, where the sending module is further configured to report a detection result of the broadcast beam detection to the network device, where the detection result is used by the network device to determine a downlink beam that needs to be swept and that is used for data communication; and the detection module is further configured to detect the downlink beam that is swept by the network device and that is used for data communication.

With reference to the technical solutions of the foregoing aspects, the broadcast beam may be a synchronization beam, or may be another beam sent periodically.

The network device and the terminal device are separately based on the foregoing methods, a corresponding step in the methods may be implemented by a corresponding module of the network device or the terminal device, and all other steps mentioned in the methods may also be implemented by corresponding modules. For details, refer to method descriptions, and the details are not described again.

In an apparatus in another form, in the network device or the terminal device, the receiving module may be implemented by a receiver, the sending module may be implemented by a transmitter, and other corresponding function modules such as the determining module and the detection module may be implemented by a processor. For a specific function, refer to corresponding descriptions in the method, and details are not described again.

In the technical solutions of the foregoing aspects in this application, the network device receives the detection result reported by the terminal device, and determines the downlink beam that needs to be swept and that is used for data communication, thereby reducing signaling overheads.

BRIEF DESCRIPTION OF DRAWINGS

To describe the technical solutions in various embodiments more clearly, the following briefly describes the accompanying drawings required for describing the embodiments or the prior art. Apparently, the accompanying drawings in the following descriptions show merely some embodiments of this application, and a person of ordinary skill in the art may derive other drawings from these accompanying drawings without creative efforts.

DESCRIPTION OF EMBODIMENTS

Various embodiments may be used for radio networks of various technologies. A radio access network may include different network devices in different systems. For example, in LTE (Long Term Evolution), LTE-A (LTE Advanced), and NR (New Radio), network elements of a radio access network include an eNB (eNodeB, evolved NodeB), a TRP (transmission reception point, transmission/reception point), and the like, and network elements of a WLAN (wireless local area network)/Wi-Fi include an access point (Access Point, AP) and the like. For other radio networks, a solution similar to that in the embodiments of this application may also be used, and an only difference lies in that a network device may be named differently. This is not limited in the embodiments of this application.

It should be further understood that in various embodiments, a terminal device includes but is not limited to user equipment (UE, User Equipment), a mobile station (MS, Mobile Station), a mobile terminal (Mobile Terminal), a mobile phone (Mobile Telephone), a handset (handset), portable equipment (portable equipment), and the like. The terminal device may communicate with one or more core networks by using a radio access network (RAN, Radio Access Network). For example, the terminal device may be a mobile phone (also referred to as a "cellular" phone), or a computer having a wireless communication function. The terminal device may alternatively be a portable mobile apparatus, a pocket-sized mobile apparatus, a handheld mobile apparatus, a computer built-in mobile apparatus, or an in-vehicle mobile apparatus.

Figure 1:
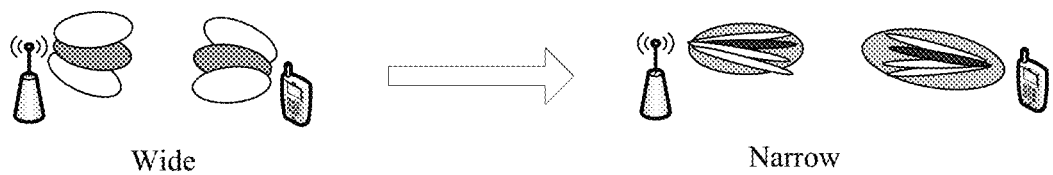
FIG. 1 is a schematic diagram of communication performed between a base station and a terminal device by using a beam.

Referring to FIG. 1, in a high-frequency communication process, a narrow beam needs to be used to ensure a propagation distance and a high beam gain, and beam alignment is performed to ensure communication quality. Therefore, in a transmission process between a network device and different terminal devices, transmission is performed on different beam pairs, and therefore the network device and the terminal device first need to perform beam sweeping, alignment, and downlink synchronization. One or more OFDM symbols are usually configured fixedly in one or more frames, for downlink synchronization beam sweeping. Each OFDM symbol may be sent periodically by the network device by using one or more downlink beams, and the terminal device detects a corresponding synchronization signal.

Figure 2A:
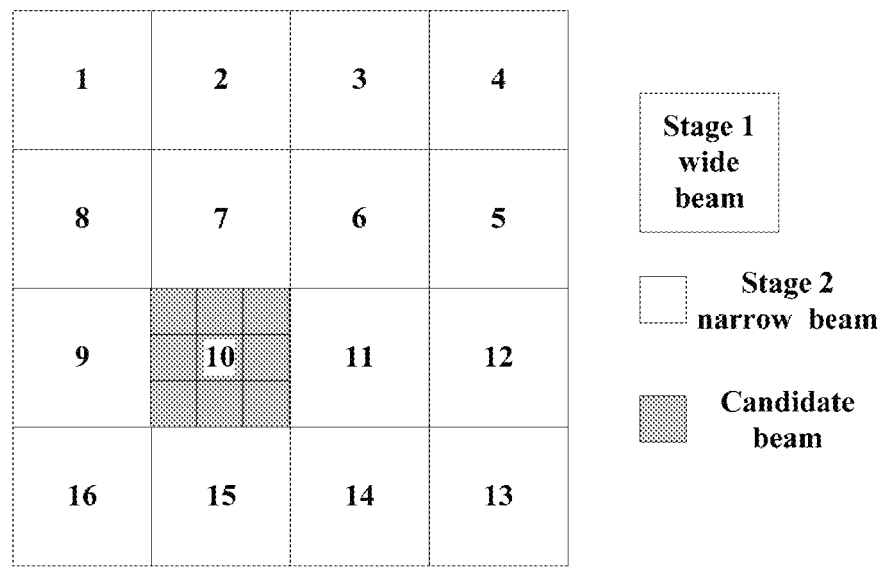
FIG. 2(a) and FIG. 2(b) are schematic diagrams of beams in a downlink-beam adjustment method according to an embodiment of this application.
Figure 2B:
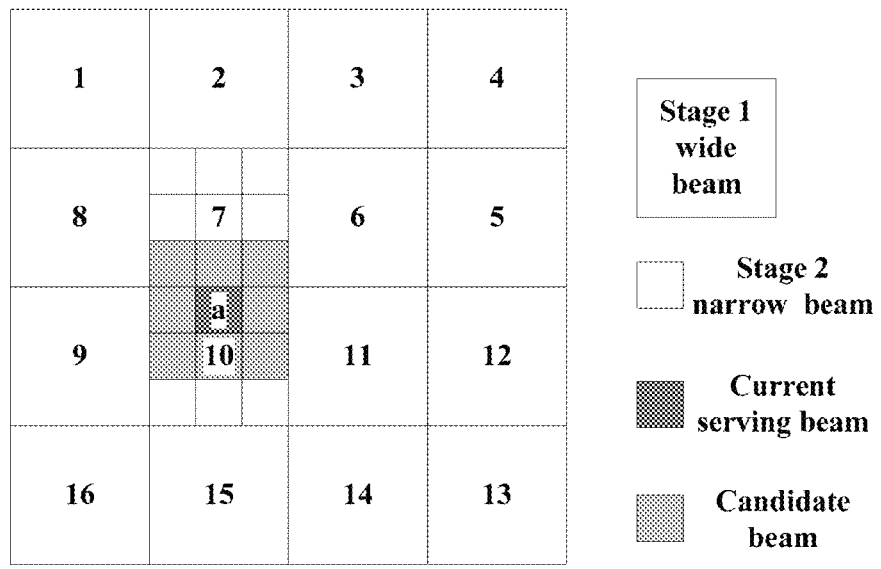

For example, a high-frequency base station uses a relatively wide beam for beam traversing, to send a synchronization signal. When accessing the high-frequency base station, the terminal device also uses a relatively wide beam to detect the synchronization signal. The high-frequency base station traverses each downlink beam to send the synchronization signal. After detecting a strongest synchronization signal, the terminal device reports a beam identifier, such as a beam ID, of a synchronization beam in which the synchronization signal is located, so that the base station and the terminal device establish a transmit/receive (TX/RX) beam pair, and the terminal device and the base station complete wide beam alignment. The foregoing synchronization manner may also be used for subsequent wide beam adjustment. A wide beam may be used for control channel transmission. However, data needs to be transmitted on a narrower beam (compared with the wide beam). Therefore, narrow beam alignment (also referred to as beam refinement, beam refinement) needs to be further performed for data channel transmission. For narrow beam alignment when a wide beam pair is established, the base station traverses narrow beams in a wide-beam coverage area. That is, the base station sweeps each narrow beam in the wide-beam coverage area to send a reference signal. The terminal device detects the reference signal sent on each narrow beam, and if one of the narrow beams is a beam whose signal strength is highest, the narrow beam may be used for data communication. For example, the terminal device detects, in the wide-beam coverage area, signal strength of each narrow beam sent by the base station, obtains one or more narrow beams whose signal quality satisfies a requirement (for example, signal strength reaches a specific threshold), and uses the one or more narrow beams for data transmission. If subsequently beam adjustment (beam adjustment) needs to be performed because of movement of the terminal device or another factor, the narrow beam and each narrow beam surrounding the narrow beam need to be traversed and swept. For example, in FIG. 2(a), during wide beam alignment, a terminal device detects that a wide beam whose signal strength is highest is a beam 10 (a current serving wide beam); in this case, during narrow beam alignment, nine narrow beams (candidate beams in a gray part of FIG. 2(a)) in the beam 10 are swept, and a narrow beam whose signal strength is highest in the nine narrow beams is determined. In another example, as shown in FIG. 2(b), during narrow beam alignment, if the terminal device detects that the narrow beam whose signal strength is highest is a beam a (a current serving narrow beam) in the wide beam 10, in subsequent narrow beam adjustment, the beam a and eight narrow beams (candidate beams in a gray part of FIG. 2(b)) surrounding the beam a are swept. The foregoing base station may be one or more base stations, or may be replaced by another network device such as a TRP. The wide beam or the narrow beam detected or swept by the terminal device may be from one or more network devices such as a base station or a TRP.

In the high-frequency data communication process, the narrow beam needs to be used to ensure the propagation distance and the high beam gain, and beam alignment needs to be performed to ensure the communication quality. After wide beam alignment and narrow beam alignment are completed between the terminal device and the base station, beam adjustment may need to be performed subsequently. For example, because of a factor such as movement of the terminal device or a change in an environment, a beam pair between the terminal device and the base station may change. Therefore, beam adjustment needs to be performed periodically or non-periodically. In a beam alignment process and a beam adjustment process, the terminal device and the base station need to traverse a plurality of beams of the terminal device and the base station, respectively. This results in relatively high overheads.

For ease of description, all the wide beams in this embodiment are synchronization beams used for downlink synchronization, such as downlink beams carrying synchronization signals, and are usually used for control channel transmission; and the narrow beam is a beam used for data communication, and is usually used for data channel transmission. An identifier corresponding to each wide beam may be predefined. For example, a corresponding beam is identified by using at least one of a beam ID, an OFDM symbol index, a frame number, a sub-frame number, a slot number, a beam resource location, and an antenna port number. A spatial relationship between the wide beams is predefined, so that both the base station and the terminal device know a wide beam adjacent to each wide beam.

A downlink-beam adjustment method in an embodiment of this application includes:

notifying, by a terminal device, a network device of information about a downlink beam used for data communication between the network device and the terminal device; determining, by the network device based on the information about the downlink beam, a broadcast beam related to the downlink beam, and notifying the terminal device of information about the broadcast beam related to the downlink beam; performing, by the terminal device, broadcast beam detection based on the information about the broadcast beam related to the downlink beam, and reporting a detection result to the network device; and determining, by the network device based on the detection result, a downlink beam that needs to be swept during downlink-beam adjustment and that is used for data communication, to perform corresponding downlink-beam sweeping, thereby facilitating beam detection by the terminal device. Further, the network device may receive the detection result reported by the terminal device, and perform a related operation, such as beam adjustment, based on the detection result.

The broadcast beam may be the synchronization beam mentioned above, or may be another type of beam sent periodically. For example, when sending beams to different terminal devices in a broadcast manner, the network device may send the beams in a beam sweeping manner, or may send beams in more than one direction each time, until terminal devices in different positions are covered.

In this embodiment, an example in which the broadcast beam is the synchronization beam is used for description. The beam adjustment mentioned in the foregoing process is downlink-narrow-beam adjustment. That is, adjustment of a downlink beam used for data communication. The downlink beam used for data communication is a narrow beam, and the synchronization beam is a wide beam. The network device may be one or more base stations, or may be another network device such as a TRP.

The network device determines, based on the detection result reported by the terminal device, the narrow beam that needs to be swept. Therefore, the terminal device and the base station do not need to traverse a plurality of beams of the terminal device and the base station, respectively. This reduces system overheads.

In an embodiment, if there is one narrow beam used for data communication with the terminal device, the narrow beam is usually a narrow beam whose signal strength is highest. A synchronization beam related to the narrow beam whose signal strength is highest may be a synchronization beam covering the narrow beam whose signal strength is highest (usually, the synchronization beam is also a synchronization beam whose signal strength is highest), and may further include a synchronization beam that is spatially adjacent to the synchronization beam covering the narrow beam whose signal strength is highest. When the terminal device performs synchronization beam detection based on information about the synchronization beam related to the downlink beam, if finding that the synchronization beam whose signal strength is highest does not change, that is, the synchronization beam is still the synchronization beam covering the narrow beam whose signal strength is highest, the terminal device may report, to the base station, a synchronization beam whose signal strength is second highest. Then, the base station may determine that the terminal device is moving to the synchronization beam whose signal strength is second highest. In this case, the base station merely needs to sweep a narrow beam, surrounding the narrow beam whose signal strength is highest, close to the synchronization beam whose signal strength is second highest, and does not need to sweep all narrow beams surrounding the narrow beam whose signal strength is highest.

Figure 3A:
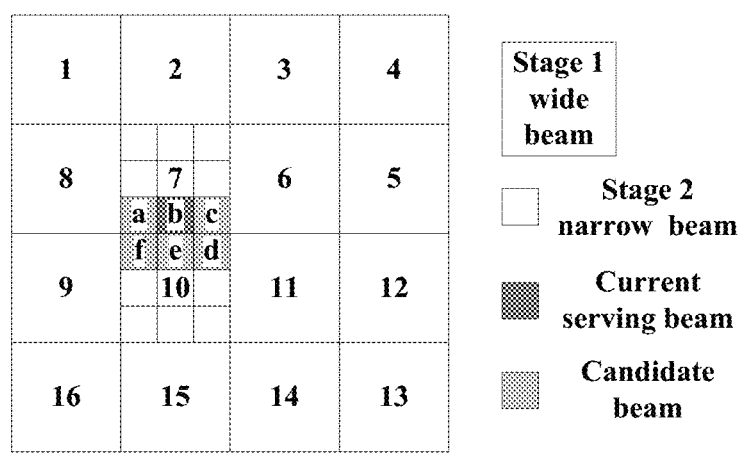
FIG. 3(a) to FIG. 3(d) are schematic diagrams of beams in a downlink-beam adjustment method according to an embodiment of this application.

For example, as shown in FIG. 3(a), during wide beam sweeping, a terminal device finds, though detection, that a synchronization beam (wide beam) whose signal strength is highest is a beam 7; in this case, during narrow beam sweeping, a base station traverses nine narrow beams in a coverage area of the beam 7, and the terminal derive determines, though detection, that a narrow beam whose signal strength is highest is a beam b (a current serving narrow beam). In a subsequent synchronization signal sweeping process, the terminal device determines that the wide beam whose signal strength is highest is still the beam 7; beams (beams 1 to 3, a beam 6, and beams 8 to 11) surrounding the beam 7 are further swept, and it is found that a beam whose signal is second highest is a beam 10. Then, it may be determined that the terminal device is moving from the beam 7 to the beam 10, or the terminal device is located between the beam 7 and the beam 10. In a subsequent narrow beam sweeping process, only the beam b and six narrow beams a to f that surround the beam b and that are close to the beam 10 need to be swept; two beams whose signal strength is highest are determined, and then, a narrow beam, between the two beams, surrounding the narrow beam whose signal strength is highest is swept. This manner reduces system overheads in a beam adjustment process.

Figure 3B:
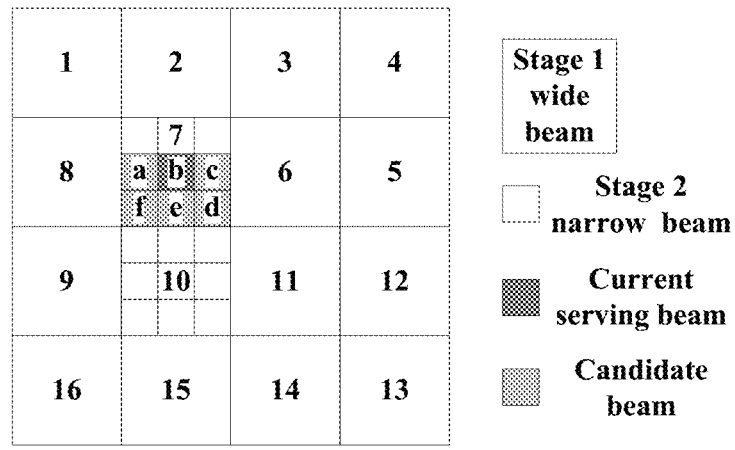
Figure 3C:
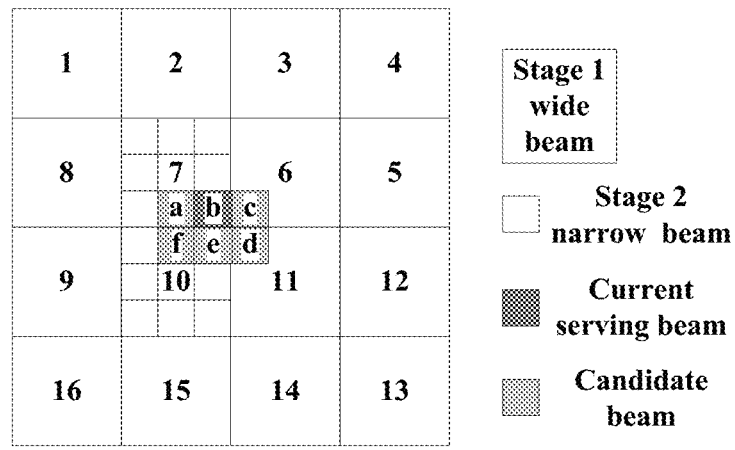
Figure 3D:
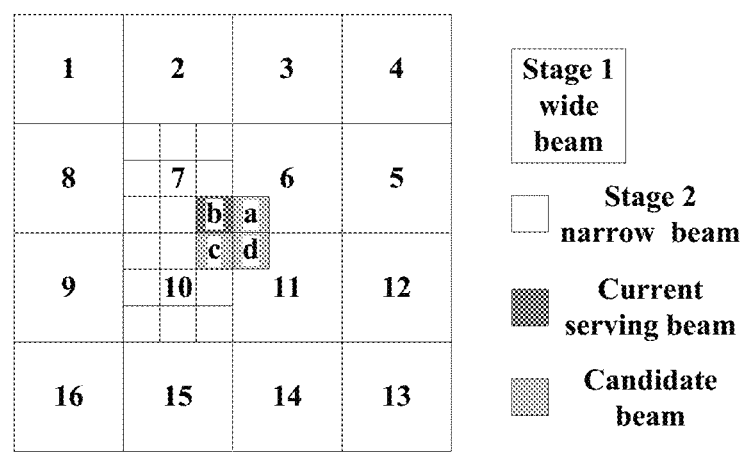

In the foregoing example, the schematic beam diagram FIG. 3(a) is merely one embodiment. There may be another case in which the synchronization beam whose signal strength is highest does not change when the terminal device performs synchronization beam detection. For example, a narrow beam whose signal strength is highest is a beam b; in this case, when a synchronization beam whose signal strength is second highest is a beam 10, in FIG. 3(b) and in FIG. 3(c), only six narrow beams a to f close to the beam 10 whose signal strength is second highest need to be swept. In FIG. 3(d), a narrow beam whose signal strength is highest is a beam b, and if a synchronization beam whose signal strength is second highest is a beam 11, only four narrow beams a to d that surround the beam b and that are close to the beam 11 need to be swept.

If the terminal device finds, through detection, that the synchronization beam whose signal strength is highest has changed and is no longer the synchronization beam covering the narrow beam whose signal strength is highest, a detected synchronization beam whose signal strength is highest is used as a current serving wide beam, and each narrow beam in a coverage area of the serving wide beam is swept, to determine a narrow beam whose signal strength is highest.

For example, in FIG. 3(a), if the terminal device determines, through detection, that a narrow beam whose signal strength is highest is a beam b, but in a subsequent synchronization signal sweeping process, the terminal device determines that a wide beam whose signal strength is highest is not in a wide beam 7 in which the narrow beam b is located, for example, the wide beam whose signal strength is highest is a beam 11 (or may be a beam 12, a beam 13, or another wide beam), the beam 11 (or the beam 12, the beam 13, or another wide beam) is used as a current serving wide beam. Subsequently, according to the method mentioned above, each narrow beam in a coverage area of the wide beam 11 is swept to determine a narrow beam whose signal strength is highest.

In the foregoing embodiment, the network device may determine a sweeping range based on the detection result reported by the terminal device, thereby reducing a quantity of swept beams in the beam adjustment process and reducing signaling overheads.

Figure 4:
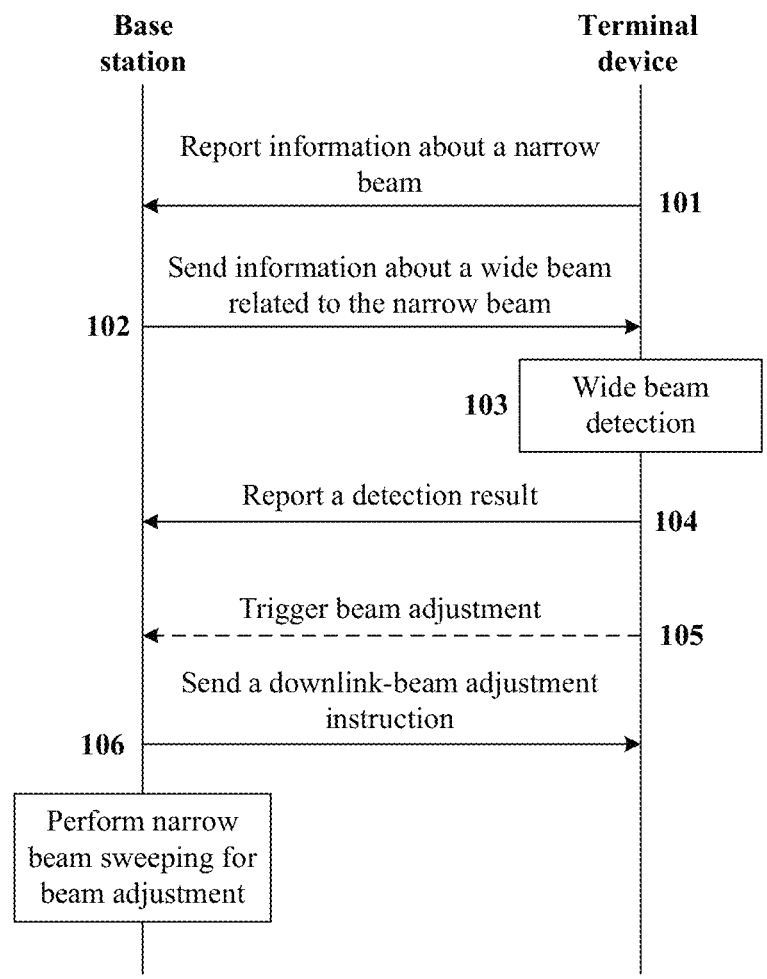
FIG. 4 is a flowchart of a downlink-beam adjustment method according to an embodiment of this application.

The following further describes the foregoing beam adjustment method with reference to accompany drawings by using an example in which a network device is a base station. Refer to FIG. 4.

101: A terminal device notifies a base station of information about a downlink narrow beam used for data communication between the base station and the terminal device.

The terminal device may notify the corresponding base station of information about a detected narrow beam whose signal quality is higher than a specified threshold. The narrow beam is a beam used for data communication, and there may be one or more such narrow beams. If there is one such narrow beam, the narrow beam is a narrow beam whose signal strength is highest. If there are a plurality of such narrow beams, signal quality of all the narrow beams is higher than the specified threshold. The plurality of narrow beams may be a plurality of narrow beams from one base station, or may be narrow beams from a plurality of base stations. A detection process may be implemented by performing the foregoing beam sweeping process or beam adjustment process. Notification content may be one or more of the following: an OFDM symbol index of the detected narrow beam, a frame number, a subframe number, a resource location of the detected narrow beam, an antenna port number, or the like. The notification content may be sent through an uplink control channel, or may be carried in RRC (radio resource control, radio resource control) signaling. In short, a notification process may be performed in a plurality of manners, and this is not limited in this embodiment.

102: The base station determines, based on the received information about the narrow beam, a wide beam related to the narrow beam, and notifies the terminal device of information about the wide beam.

The wide beam related to the narrow beam may be a wide beam in which the narrow beam is located. That is, a wide beam covering the narrow beam, and the terminal device may also be further notified of a wide beam surrounding the wide beam. The base station may also determine a wide beam that needs to be swept by the terminal device, and notify the terminal device.

For example, referring to FIG. 3(*a*), a narrow beam b whose signal strength is highest and that is aligned between the base station and the terminal device is currently located in a wide beam 7, the terminal device may be notified of information about the wide beam 7, and the terminal device may also be further notified of wide beams (beams 1 to 3, a beam 6, and beams 8 to 11) surrounding the beam 7. Notified beam information may be any one or more of the following: a beam ID of the wide beam, an OFDM symbol index, an antenna port number, a slot number, a subframe number, a radio frame number, and the like. This is not limited in this embodiment. The beam information is used by the terminal device to determine a wide beam that needs to be swept and that is spatially adjacent to the wide beam.

In another example, the base station may directly notify the terminal device of each wide beam that needs to be swept, and the base station may also send, to the terminal device, beam information of all the wide beam 7 and wide beams 1 to 3 and wide beams 6 to 11 spatially adjacent to the wide beam 7, where all these wide beams need to be swept by the terminal device. Certainly, other wide beams such as a beam 4, a beam 5, and beams 12 to 16 may be further included. In other words, the base station may determine a wide beam that needs to be swept by the terminal device, and notify the terminal device.

In still another example, the base station and the terminal device may maintain a transmit/receive (TX/RX) synchronization beam pair, and therefore, if the wide beam 7 in which the narrow beam is located and that is reported by the terminal device to the base station is still a maintained TX synchronization beam currently, the base station may not send beam information of the wide beam 7 to the terminal device, because the terminal device knows the beam information of the wide beam 7; if the wide beam 7 in which the narrow beam is located and that is reported by the terminal device to the base station is not a maintained TX synchronization beam currently, the base station may send information about the wide beam 7 to the terminal device, and may use the beam 7 as a serving wide beam of the terminal device.

A notification message used to notify the terminal device may be carried by using a downlink control channel, may be sent by using RRC signaling, or the like. This is not limited in this embodiment.

103: The terminal device detects signal strength of each downlink wide beam.

For example, the terminal device performs synchronization beam detection, and detects all synchronization beams (downlink wide beam) sent by the base station. During synchronization beam detection, the terminal device measures time-frequency resources of the synchronization beams.

104: The terminal device notifies the base station of a detection result of a wide beam whose signal quality satisfies a preset threshold.

In an example, as shown in FIG. 2(*a*) and FIG. 2(*b*), the terminal device detects signal strength of each synchronization beam, and the terminal device may compare synchronization beams 1 to 3 and beams 6 to 11 surrounding a beam 7. If a beam whose signal strength is highest is still the beam 7, and the terminal device also detects that a beam whose signal strength is second highest in the wide beams 1 to 3 and beams 6 to 11 that are adjacent to the beam 7 and that surround the beam 7 is a beam 10, the terminal device reports the beam 7 whose signal strength is highest and the beam 10 whose signal strength is second highest and that surrounds the beam 7. Report content may be beam information (such as a beam ID), or beam information and quality of the corresponding beam. The report content may be sent through an uplink control channel, or sent by using RRC signaling or the like. This is not limited in this embodiment. Certainly, because the beam whose signal strength is highest does not change, the terminal device may alternatively report only information about the beam whose signal strength is second highest.

Alternatively, as shown in FIG. 3(*d*), the terminal device detects that the synchronization beam whose signal strength is highest is still the beam 7, and also detects that a beam whose signal strength is second highest in the wide beams 1 to 3 and beams 6 to 11 that are adjacent to the beam 7 and that surround the beam 7 is a beam 11, the terminal device reports the beam 7 whose signal strength is highest and the beam 11 whose signal strength is second highest and that surrounds the beam 7. Report content may be beam information (such as a beam ID), or beam information and quality of the corresponding beam. The report content may be sent through an uplink control channel, or sent by using RRC signaling or the like. This is not limited in this embodiment. Certainly, because the beam whose signal strength is highest does not change, the terminal device may alternatively report only information about the beam whose signal strength is second highest.

In another example, the terminal device may report, to the base station, information and signal quality of both the detected beam 7 whose signal strength is highest and that satisfies a specific signal quality threshold, and a synchronization beam that satisfies a signal quality threshold and that is in the synchronization beams 1 to 3 and beams 6 to 11 surrounding the beam 7. The base station determines, based on the information, a narrow beam that needs to be swept during beam adjustment. Report content may be beam information (such as a beam ID), or beam information and quality of the corresponding beam. The report content may be sent through an uplink control channel, or sent by using RRC signaling or the like. This is not limited in this embodiment.

After receiving the detection result of the wide beam, the base station may determine, based on the detection result, the narrow beam that needs to be swept during downlink-beam adjustment. The following provides descriptions by using an example.

If the detection result indicates that the wide beam whose signal strength is highest does not change, it may be determined that each narrow beam that surrounds the narrow beam and that is close to the wide beam whose signal strength is second highest is to be swept.

For example, as shown in FIG. 3(*a*), FIG. 3(*b*), and FIG. 3(*c*), the base station determines that six beams a to f that are closest to the beam b and that are between the beam 7 and the beam 10 need to be swept in a beam adjustment process, so that the terminal device detects and reports a narrow beam that satisfies a signal quality requirement.

Alternatively, as shown in FIG. 3(*d*), the base station determines that four beams a to d that are closest to the beam b and that are between the beam 7 and the beam 11 need to be swept in a beam adjustment process, so that the terminal device detects and reports a narrow beam that satisfies a signal quality requirement.

It should be noted that determining, by the base station based on the synchronization beam information reported by the terminal device, which narrow beam needs to be swept in the beam adjustment process is an internal implementation process of the base station. FIG. 3(*a*), FIG. 3(*b*), FIG. 3(*c*), and FIG. 3(*d*) give some examples in which the base station determines to sweep some narrow beams surrounding the current serving narrow beam b. An actual operation process is not limited to implementations in FIG. 3(*a*), FIG. 3(*b*), FIG. 3(*c*), and FIG. 3(*d*), and there may be another adjustment manner.

105: Trigger a beam adjustment (Beam adjustment) process. This step is optional, and may be performed before step 104. If triggering is performed by the base station, a signaling instruction is not needed. If triggering is performed by the terminal device, the terminal device needs to send uplink signaling, to trigger the beam adjustment process. The uplink signaling may be sent through an uplink control channel or by using RRC signaling or the like. This is not limited in this embodiment.

106: The base station sends signaling of a downlink-beam adjustment instruction to the terminal device, where the signaling may carry a resource location of the downlink narrow beam that needs to be detected, or carry a resource indication in another manner. The signaling is sent through a downlink control channel or by using RRC signaling or the like. This is not limited in this embodiment.

Then the base station may perform narrow beam sweeping for downlink-beam adjustment, so that the terminal device performs detection on a corresponding time-frequency resource and reports a detection result. After the terminal device reports, to the base station, information about a narrow beam that satisfies a signal quality requirement, the base station may perform narrow beam adjustment.

In the foregoing embodiment of beam adjustment, in step 104, the terminal device detects that the synchronization beam whose signal strength is highest does not change and is still the wide beam 7 covering the narrow beam whose signal strength is highest. In another embodiment, in step 104, if the terminal device detects that the synchronization beam whose signal strength is highest has changed and is no longer the wide beam 7 covering the narrow beam whose signal strength is highest, for example, if signal strength of the beam 10 is already greater than that of the beam 7, or a beam different from the synchronization beams 1 to 3 and the beams 6 to 11 becomes the beam whose signal strength is highest, the terminal device reports the new beam whose signal strength is highest. Report content may be beam information, or beam information and quality of the corresponding beam. The report content may be sent through an uplink control channel or by using RRC signaling or the like. The base station updates the current serving wide beam to the new beam whose signal strength is highest and that is reported by the terminal device, and all narrow beams in a coverage area of the new serving wide beam are swept in a next beam adjustment process.

In the foregoing embodiment of beam adjustment, the base station may determine, based on the wide beam detection result reported by the terminal device, the downlink narrow beam that needs to be swept, thereby reducing system overheads.

Figure 5:
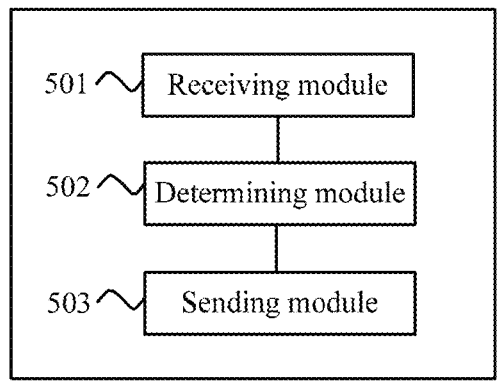
FIG. 5 is a schematic diagram of a network device according to an embodiment of this application.

With respect to the base station in the foregoing method embodiments, referring to FIG. 5, an embodiment further discloses a network device, including:

a receiving module 501, configured to receive information that is sent by a terminal device and that is about a downlink beam used for data communication with the terminal device;

a determining module 502, configured to determine, based on the information about the downlink beam, a broadcast beam related to the downlink beam; and a sending module 503, configured to notify the terminal device of information about the broadcast beam related to the downlink beam.

The receiving module is further configured to receive a detection result, reported by the terminal device, of broadcast beam detection performed based on the information about the broadcast beam.

The determining module is further configured to determine, based on the detection result, a downlink beam that needs to be swept during downlink-beam adjustment and that is used for data communication.

The network device is not limited to a base station, and may be a TRP or a network device of another type alternatively.

Figure 6:
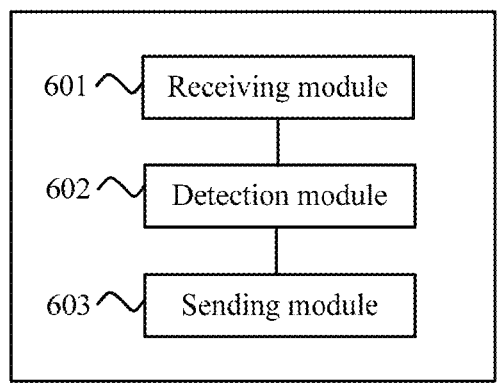
FIG. 6 is a schematic diagram of a terminal device according to an embodiment of this application.

With respect to the terminal device in the foregoing method embodiments, referring to FIG. 6, an embodiment further discloses a terminal device, including:

a sending module 603, configured to notify a network device of information about a downlink beam used for data communication between the network device and the terminal device;

a receiving module 601, configured to receive information that is sent by the network device and that is about a broadcast beam related to the downlink beam; and a detection module 602, configured to perform broadcast beam detection based on the information about the broadcast beam related to the downlink beam.

The sending module is further configured to report a detection result of the broadcast beam detection to the network device, and the detection result is used by the network device to determine a downlink beam that needs to be swept and that is used for data communication.

The detection module is further configured to detect the downlink beam that is swept by the network device and that is used for data communication.

In the foregoing apparatus embodiments, a corresponding function module performs a corresponding step in the method embodiments. For specific steps, refer to a corresponding method. Other corresponding steps may also be implemented by corresponding modules, and reference may be made to descriptions in the method embodiments. Details are not described herein again.

In an apparatus embodiment in another form, the receiving module may be implemented by a receiver, and the sending module may be implemented by a transmitter. Other corresponding function modules such as the determining module and the detection module may be implemented by a processor. For details, refer to FIG. 7. For other corresponding steps, refer to the method embodiments. Details are not described herein again.

In the technical solutions in various embodiments, the network device receives the detection result reported by the terminal device, and determines the downlink narrow beam that needs to be swept. This reduces the quantity of swept beams and reduces the signaling overheads.

Figure 7:
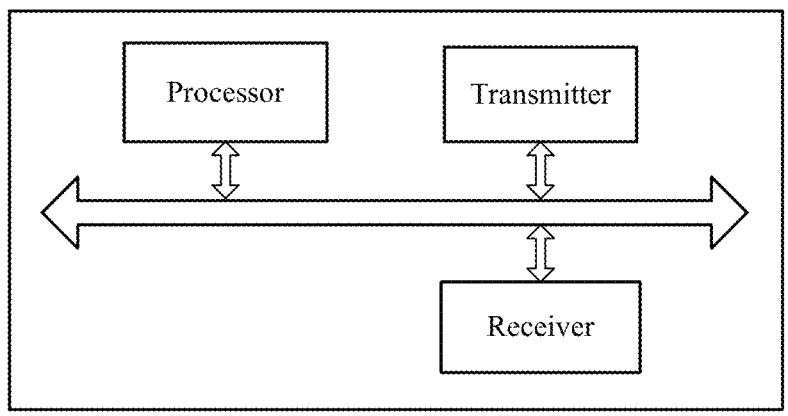
FIG. 7 is a schematic diagram of a network device and a terminal device according to another embodiment of this application.

In some embodiments, the components of the device in FIG. 7 may be coupled together by using a bus system. In addition to a data bus, the bus system further includes a power bus, a control bus, and a status signal bus.

It should be understood that in the embodiments of this application, the processor may be a central processing unit (Central Processing Unit, "CPU" for short), or the processor may be another general purpose processor, a digital signal processor (DSP), an application-specific integrated circuit (ASIC), a field programmable gate array (FPGA) or another programmable logic device, a discrete gate or transistor logic device, a discrete hardware component, or the like. The general purpose processor may be a microprocessor, or the processor may be any conventional processor or the like.

The memory may include a read-only memory and a random access memory, and provide an instruction and data for the processor. A part of the memory may further include a non-volatile random access memory. For example, the memory may further store information about a device type.

In addition to the data bus, the bus system may further include the power bus, the control bus, the status signal bus, and the like. However, for clear description, various types of buses in the figure are all denoted as the bus system.

It should be understood that the term "and/or" in this specification represents only an association relationship for describing associated objects, and indicates that three relationships may exist. For example, A and/or B may indicate the following three cases: only A exists, both A and B exist, and only B exists. In addition, the character "/" in this specification usually indicates an "or" relationship between associated objects.

It should be understood that in the embodiments of this application, sequence numbers of the foregoing processes do not mean execution sequences. The execution sequences of the processes should be determined based on functions and internal logic of the processes, but should not be construed as any limitation on implementation processes of the embodiments of this application.

A person of ordinary skill in the art may be aware that units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be understood by a person skilled in the art that, for ease and brevity of description, for detailed working processes of the foregoing system, apparatus, and unit, reference may be made to corresponding processes in the foregoing method embodiments, and details are not described herein again.

In the several embodiments provided herein, it should be understood that the disclosed system, apparatus, and method may be implemented in other manners. For example, the described apparatus embodiment is merely an example. For example, the unit division is merely logical function division and may be other division during actual implementation. For example, a plurality of units or components may be combined or may be integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions in the embodiments.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes one or more instructions for instructing a computer device (which may be a personal computer, a server, a network device, or the like) to perform all or some of the steps of the methods in the embodiments of this application. The foregoing storage medium includes various media that can store program code, such as a USB flash drive, a removable hard disk, a read-only memory (ROM, Read-Only Memory), a random access memory (RAM, Random Access Memory), a magnetic disk, an optical disc, or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A beam detection method, comprising:
   notifying, by a network device, a terminal device of information about a plurality of broadcast beams;
   receiving, by the network device, a detection result, reported by the terminal device, of broadcast beam detection performed based on the information about the plurality of broadcast beams, wherein the detection result comprises a first broadcast beam within the plurality of broadcast beams whose signal quality is the highest, and a second broadcast beam within the plurality of broadcast beams whose signal quality is the second highest; and
   determining, by the network device, a first downlink beam for data communication with the terminal device based on the detection result, wherein the first downlink beam is located in one of the first and second broadcast beams,
   wherein before notifying the terminal device, further comprising:
   receiving, by the network device, information indicating a second downlink beam for data communication with the terminal device; and
   determining, by the network device based on the information indicating the second downlink beam, a third broadcast beam, wherein the third broadcast beam is located in the plurality of broadcast beams.

2. The method according to claim 1, wherein the second downlink beam for data communication with the terminal device is a downlink beam whose signal strength is the highest among all the downlink beams detected by the terminal device or a downlink beam whose signal quality is higher than a preset threshold.

3. The method according to claim 1, wherein the third broadcast beam comprises at least one of the following: a broadcast beam in which the second downlink beam is located, or a broadcast beam spatially adjacent to the broadcast beam in which the second downlink beam is located.

4. The method according to claim 1, wherein the detection result of the broadcast beam detection comprises:
   a detection result of a broadcast beam whose signal quality is higher than a specified threshold.

5. The method according to claim 4, wherein the detection result of the broadcast beam detection comprises information indicating the first and second broadcast beams and/or signal quality of the first and second broadcast beams.

6. The method according to claim 1, wherein
   the information indicating the first and second broadcast beams comprises at least one of the following: a beam identifier, an orthogonal frequency division multiplexing (OFDM) symbol index, a frame number, a subframe number, a beam resource location, and an antenna port number.

7. The method according to claim 1, wherein the third broadcast beam is a broadcast beam used to send a synchronization signal.

8. The method according to claim 1, wherein determining, by the network device, a first downlink beam for data communication with the terminal device based on the detection result comprises:
   scanning, by the network device, downlink beams within the first broadcast beam and adjacent the second broadcast beam.

9. An apparatus, wherein the apparatus is a network device or a functional unit integrated into a network device, and comprises:
   a transmitter, configured to notify a terminal device of information about a plurality of broadcast beams; and
   a receiver, configured to receive a detection result, reported by the terminal device, of broadcast beam detection performed based on the information about the plurality of broadcast beams, wherein the detection result comprises a first broadcast beam within the plurality of broadcast beams whose signal quality is the highest, and a second broadcast beam within the plurality of broadcast beams whose signal quality is the second highest; and
   a processor, configured to determine a first downlink beam for data communication with the terminal device based on the detection result, wherein the first downlink beam is located in one of the first and second broadcast beams,
   wherein the receiver is further configured to receive information indicating a second downlink beam sent by the terminal device, the second downlink beam being for data communication with the terminal device; and
   the processor is further configured to determine, based on the information indicating the second downlink beam, a third broadcast beam related to the downlink beam, wherein the third broadcast beam is located in the plurality of broadcast beams.

10. The apparatus according to claim 9, wherein the third broadcast beam is a broadcast beam used to send a synchronization signal.

* * * * *